(12) United States Patent
Sakai et al.

(10) Patent No.: US 7,902,756 B2
(45) Date of Patent: Mar. 8, 2011

(54) PHOSPHOR, LIGHT-EMITTING DEVICE, AND PLASMA DISPLAY PANEL

(75) Inventors: Masahiro Sakai, Kyoto (JP); Seigo Shiraishi, Osaka (JP); Takehiro Zukawa, Osaka (JP); Kojiro Okuyama, Nara (JP)

(73) Assignee: Panasonic Corporation, Osaka (JP)

( * ) Notice: Subject to any disclaimer, the term of this patent is extended or adjusted under 35 U.S.C. 154(b) by 303 days.

(21) Appl. No.: 12/278,345

(22) PCT Filed: Feb. 7, 2007

(86) PCT No.: PCT/JP2007/052133
§ 371 (c)(1),
(2), (4) Date: Aug. 5, 2008

(87) PCT Pub. No.: WO2007/091603
PCT Pub. Date: Aug. 16, 2007

(65) Prior Publication Data
US 2009/0021145 A1    Jan. 22, 2009

(30) Foreign Application Priority Data

Feb. 7, 2006  (JP) ................................. 2006-029362
Feb. 20, 2006 (JP) ................................. 2006-042146

(51) Int. Cl.
*H01J 17/49* (2006.01)
*C09K 11/08* (2006.01)
(52) U.S. Cl. .................. 313/582; 252/301.4 F; 313/486
(58) Field of Classification Search ............ 252/301.4 F; 313/582, 486
See application file for complete search history.

(56) References Cited

U.S. PATENT DOCUMENTS

| 6,802,990 B2 | 10/2004 | Toda et al. |
| 6,838,825 B2 * | 1/2005 | Shiiki et al. ................... 313/582 |
| 7,138,965 B2 | 11/2006 | Shiiki et al. |
| 7,221,083 B2 | 5/2007 | Oaku et al. |

FOREIGN PATENT DOCUMENTS

| JP | 2000-063823 A | 2/2000 |
| JP | 2002-332481 A | 11/2002 |
| JP | 2003-132803 A | 5/2003 |

(Continued)

OTHER PUBLICATIONS

Japanese Office Action, dated Mar. 27, 2008, along with the English translation.

(Continued)

*Primary Examiner* — Peter J Macchiarolo
*Assistant Examiner* — Glenn Zimmerman
(74) *Attorney, Agent, or Firm* — Hamre, Schumann, Mueller & Larson, P.C.

(57) ABSTRACT

The present invention is a blue phosphor that is represented by a general formula $xSrO \cdot yEuO \cdot MgO \cdot zSiO_2$, where $2.970 \leq x \leq 3.500$, $0.006 \leq y \leq 0.030$, and $1.900 \leq z \leq 2.100$. This blue phosphor has a crystal structure that is essentially a merwinite structure, and the crystal structure has a unit cell volume of 714.8 Å$^3$ or less. Or, in this blue phosphor, a peak appearing around $2\theta = 22.86$ degrees in an X-ray diffraction pattern obtained by measurement of the blue phosphor using an X-ray with a wavelength of 0.773 Å has a one-fifth value width of 0.17 degrees or less. Furthermore, the present invention is a light-emitting device having a phosphor layer including the phosphor. A suitable example of the light-emitting device is a plasma display panel.

18 Claims, 6 Drawing Sheets

FOREIGN PATENT DOCUMENTS

| | | | |
|---|---|---|---|
| JP | 2004-157036 | A | 6/2004 |
| JP | 2004-176010 | A | 6/2004 |
| JP | 2006-008746 | A | 1/2006 |
| JP | 2006-012770 | A | 1/2006 |
| JP | 2006-124644 | A | 5/2006 |
| WO | WO 2006112405 | A1 * | 10/2006 |
| WO | WO 2007013515 | A1 * | 2/2007 |

OTHER PUBLICATIONS

Ha-Kyun Jung et al., "Luminescent properties of $Eu^{2+}$-activated $(Ba, Sr)_3MgSi_2O_8$ phosphor under VUV irradiation", Optical Materials, vol. 28, 2006, pp. 602-605.

Japanese Office Action dated Mar. 27, 2008.

* cited by examiner

PHOSPHOR, LIGHT-EMITTING DEVICE, AND PLASMA DISPLAY PANEL

TECHNICAL FIELD

The present invention relates to a silicate blue phosphor, and to a light-emitting device such as a plasma display panel.

BACKGROUND ART

Various aluminate phosphors have been put to practical use as phosphors for energy-saving fluorescent lamps. Examples of blue phosphors include $(Ba,Sr)MgAl_{10}O_{17}$:Eu (BAM:Eu), and examples of green phosphors include $CeMgAl_{11}O_{19}$:Tb and $BaMgAl_{10}O_{17}$:Eu,Mn.

In recent years, BAM:Eu, which has high luminance under vacuum-ultraviolet excitation, has been used as a blue phosphor for a plasma display panel (PDP).

However, when a light-emitting device, especially one using the blue phosphor BAM:Eu, is driven for a long period of time, the luminance is degraded significantly. Hence, for use in a light-emitting device, particularly in a PDP, there is a strong demand for a phosphor that shows less luminance degradation even after the long-term driving.

In response to this demand, methods using certain kinds of silicate phosphors for light-emitting devices are proposed. For example, JP 2003-132803 A and JP 2004-176010 A disclose a method using $(Sr_{1-a}Ba_a)_{3-d}MgSi_2O_8$:$Eu_d$ (where $0 \leq a \leq 1$ and $0.01 \leq d \leq 0.1$). JP 2006-12770 A discloses a method using $M_{3-e}MgSi_2O_8$:$Eu_e$ (where M is at least one element selected from a group consisting of Sr, Ca and Ba, and $0.001 \leq e \leq 0.2$).

However, the intensive studies of the present inventors have revealed that the light-emitting devices using the phosphors described in the above-mentioned documents, in most cases, cannot achieve inhibition of the luminance degradation of the phosphors during driving while maintaining high luminance. Moreover, these methods have the following problems. When a Sr site is not replaced with Ba, the chromaticity y is higher and the color purity is worse than those of a blue phosphor BAM:Eu that is currently used in the PDP. On the other hand, when the Sr site is replaced with Ba, the emission luminance drops significantly.

DISCLOSURE OF INVENTION

The present invention has been conceived to solve the above conventional problems, and it is an object of the present invention to provide a phosphor that has a high luminance, shows less luminance degradation during driving of a light-emitting device, and has a chromaticity y comparable to that of BAM:Eu in a PDP. It is a further object of the present invention to provide a long-life light-emitting device using the above phosphor, in particular a PDP.

As a result of a series of intensive studies, the present inventors have found that when a blue phosphor, which is represented by a general formula $xSrO \cdot yEuO \cdot MgO \cdot zSiO_2$ (where $2.970 \leq x \leq 3.500$, $0.006 \leq y \leq 0.030$, and $1.900 \leq z \leq 2.100$), is obtained by firing under a certain partial pressure of oxygen, the obtained blue phosphor has a high luminance, shows less luminance degradation during driving of a light-emitting device, and has a chromaticity y comparable to that of BAM:Eu in a PDP. The present inventors also have found that the blue phosphor has unique properties that can be identified by an X-ray diffraction measurement. The present inventors further have found that a long-life light-emitting device, in particular a PDP, can be provided using the phosphor, resulting in the achievement of the present invention.

The first embodiment of the present invention is a blue phosphor that is represented by a general formula $xSrO \cdot yEuO \cdot MgO \cdot zSiO_2$, where $2.970 \leq x \leq 3.500$, $0.006 \leq y \leq 0.030$, and $1.900 \leq z \leq 2.100$. This blue phosphor has a crystal structure that is essentially a merwinite structure, and the crystal structure has a unit cell volume of 714.8 Å$^3$ or less (0.7148 nm$^3$ or less).

The second embodiment of the present invention is a blue phosphor that is represented by a general formula $xSrO \cdot yEuO \cdot MgO \cdot zSiO_2$, where $2.970 \leq x \leq 3.500$, $0.006 \leq y \leq 0.030$, and $1.900 \leq z \leq 2.100$. In this blue phosphor, a peak appearing around $2\theta = 22.86$ degrees in an X-ray diffraction pattern obtained by measurement of the blue phosphor using an X-ray with a wavelength of 0.773 Å has a one-fifth value width of 0.17 degrees or less.

Another embodiment of the present invention is a light-emitting device having a phosphor layer including either one of these blue phosphors, and a suitable example of the light-emitting device is a plasma display panel.

The plasma display panel includes, for example: a front panel; a back panel that is arranged to face the front panel; barrier ribs that define the clearance between the front panel and the back panel; a pair of electrodes that are disposed on the back panel or the front panel; an external circuit that is connected to the electrodes; a discharge gas that is present at least between the electrodes and contains xenon that generates a vacuum ultraviolet ray by applying a voltage between the electrodes through the external circuit; and phosphor layers that emit visible light induced by the vacuum ultraviolet ray. In this plasma display panel, the phosphor layers include a blue phosphor layer, and the blue phosphor layer contains the present phosphor.

BEST MODE FOR CARRYING OUT THE INVENTION

Composition of Phosphor

Figure 1:
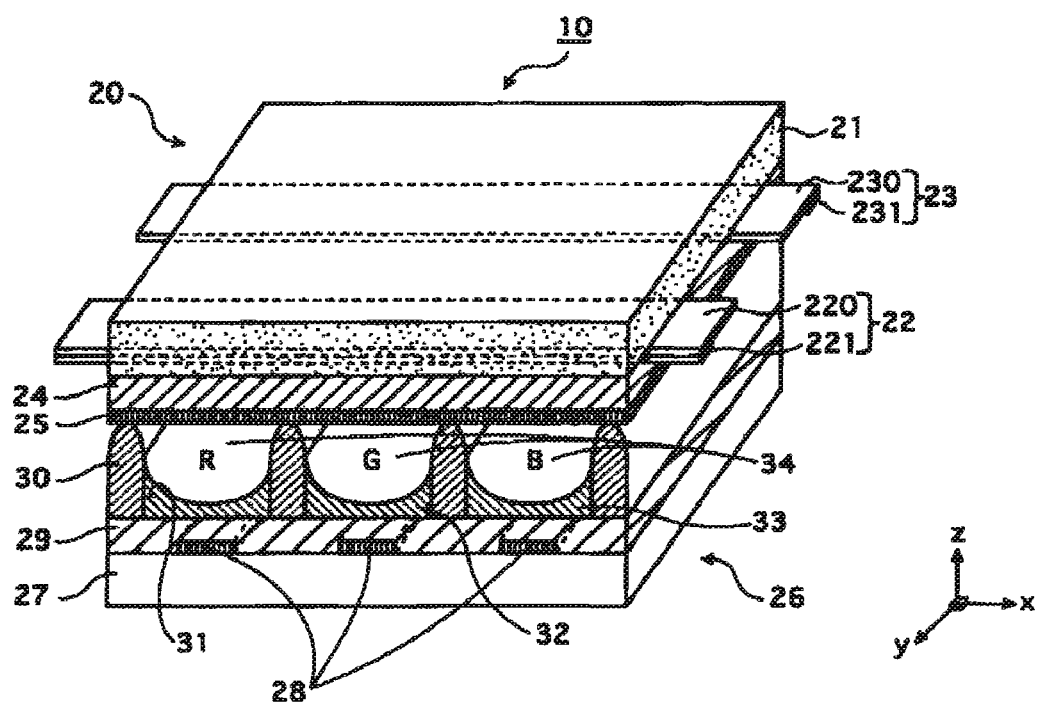
FIG. 1 is a schematic cross-sectional perspective view showing one example of a configuration of a PDP of the present invention.

The blue phosphor of the present invention is represented by the general formula $xSrO \cdot yEuO \cdot MgO \cdot zSiO_2$ (where $2.970 \leq x \leq 3.500$, $0.006 \leq y \leq 0.030$, $1.900 \leq z \leq 2.100$). The values of x, y and z are preferably in the ranges of $2.982 \leq x \leq 2.994$, $0.006 \leq y \leq 0.018$, and $1.995 \leq z \leq 2.005$, respectively. More preferably, the value of x is in the range of $2.985 \leq x \leq 2.994$, and the value of z is 2.000.

<Properties of Phosphor Identified by X-Ray Diffraction Analysis>

In the first embodiment of the phosphor of the present invention, the phosphor has a crystal structure that is essentially a merwinite structure, and the unit cell volume of the crystal structure is 714.8 Å$^3$ or less. In the present invention, the crystal structure of the phosphor is considered to be essentially a merwinite structure if the merwinite structure constitutes 98% or more of the entire structure. It is presumed that the electronic structure derived from the essentially merwinite crystal structure increases the excitation efficiency in the vacuum ultraviolet region. It also is presumed that the unit cell volume of 714.8 Å$^3$ or less strengthens the local structure around the replacing Eu, thereby improving the resistance to degradation.

In the first embodiment, the a-axis length, b-axis length, and c-axis length preferably are 13.871 Å or less, 5.455 Å or less, and 9.447 Å or less, respectively. The angle β between the a-axis and the c-axis preferably is 90.180 degrees or less.

In the first embodiment, it is preferable that the phosphor has an impurity crystalline phase at least partially, and that the crystal structure of the impurity crystalline phase has an akermanite structure. It is preferable that the abundance ratio of the impurity crystalline phase having the akermanite structure is 1.96% or less of the entire crystal structure of the phosphor.

In the second embodiment of the phosphor of the present invention, a peak appearing around 2θ=22.86 degrees in an X-ray diffraction pattern obtained by measurement of the phosphor using an X-ray with a wavelength of 0.773 Å has a one-fifth value width of 0.17 degrees or less. According to the studies of the present inventors, it is presumed that the one-fifth value width of the peak around 2θ=22.86 degrees reflects a deviation of a Sr atom from the normal position, and a small value of the one-fifth value width means a small deviation of the Sr atom from the normal position, resulting in a high resistance to degradation.

The lattice constants a, b and c, β (angle between the a-axis and c-axis), unit cell volume V, and one-fifth value width of the peak can be obtained by a powder X-ray diffraction measurement. Hereinafter, a specific method will be described in detail.

The powder X-ray diffraction measurement can be performed in the following manner, by using, for example, BL19B2 powder X-ray diffraction equipment (Debye-Scherrer optical system using an imaging plate; hereinafter referred to as BL19 diffraction equipment) in the large-scale synchrotron radiation facility, SPring 8.

First, the one-fifth value width of the peak can be obtained in the following manner. Phosphor powder is packed tightly into a Lindemann glass capillary with an internal diameter of 200 μm. The incident X-ray wavelength is set to approximately 0.773 Å (about 0.0773 nm) using a monochromator. While a sample is spun using a goniometer, a diffraction intensity is recorded on an imaging plate. The measuring time is to be determined, paying attention to keep the imaging plate unsaturated. The measuring time is, for example, 5 minutes. The imaging plate is developed and an X-ray diffraction spectrum is read out. Then, the one-fifth value width of the peak around 2θ=22.86 degrees is read out. A one-fifth value width is defined as the full width of a peak at a height one fifth of a peak intensity (see FIG. 5).

Next, for a measurement of the lattice constants and the interatomic distances, a powder X-ray diffraction and Rietveld analysis are used. For the Rietveld analysis, RIETAN-2000 program (Rev. 2.3.9 or later; hereinafter referred to as RIETAN) is used (see NAKAI Izumi, IZUMI Fujio, "Funmatsu X-sen kaiseki-no-jissai—Rietveld hou nyumon" (Practice of powder X-ray analysis—introduction to Rietveld method) Discussion Group of X-Ray Analysis, the Japan Society for Analytical Chemistry, Asakura Publishing, 2002, and http://homepage.mac.com/fujioizumi/).

First, an incident X-ray wavelength is determined using CeO$_2$ powder (SRM No. 674a) of NIST (National Institute of Standards and Technology) with a lattice constant of 5.4111 Å. The powder is tightly packed into a Lindemann glass capillary with an internal diameter of 200 μm. The incident X-ray wavelength is set to be approximately 0.773 Å using the BL19 diffraction equipment. While a sample is spun using a goniometer, a diffraction intensity is recorded on an imaging plate. The measuring time is to be determined, paying attention to keep the imaging plate unsaturated, and, for example, it is 2 minutes. The imaging plate is developed and an X-ray diffraction spectrum is read out.

Next, the incident X-ray wavelength is precisely determined by the Rietveld analysis with the lattice constant fixed. The obtained X-ray diffraction spectrum is analyzed based on ICSD (Inorganic Crystal Structure Database) #28753. In this regard, XLMDX (hereinafter represented as λ) is set to be 0.771, 0.772, 0.773, 0.774 and 0.775 Å, and the analysis is carried out on each of them. The conditions of these analyses are shown in Table 1. It should be noted that a refinement is carried out within the range of 2θ=6 to 60°.

TABLE 1

| (1) Parameter | |
| --- | --- |
| NBEAM | 2 |
| NMODE | 0 |
| XLMDX | 0.771-0.775 |
| NSURFR | 2 |
| PCOR2 | 0.05 |
| CTHM2 | 1 |
| XMUR2 | 0 |
| VNS1 | A-225-1 |
| LSPSYM1 | 0 |
| LPAIR1 | 0 |
| INDIV1 | 1 |
| NPROR1 | 3 |
| IHP1 | 0 |
| IKP1 | 0 |
| ILP1 | 1 |
| LSUM1 | 0 |
| IHA1 | 0 |
| IKA1 | 0 |
| ILA1 | 1 |
| NPRFN | 2 |
| NSHIFT | 4 |
| NEXC | 1 |
| NRANGE | 0 |
| PC | 7 |
| NLESQ | 2 |
| STEP | 0.02 |
| ACC | 1.00E−06 |
| NC | 0 |
| TK | 650 |
| NDA | 1 |

| (2) Initial value and setting of refinement (ID) | | | | | |
| --- | --- | --- | --- | --- | --- |
| | t0 | t1 | t2 | t3 | ID |
| shiftn | 0 | 0 | 0 | 0 | 1111 |

TABLE 1-continued

| Lattice constant a | | | | 5.4111(fixed) | |
|---|---|---|---|---|---|
| | Occu-pancy | Fractional coordinate | | Displace-ment parameter | Refine-ment |
| | g | x | y | z | B | ID |
| Ce/Ce4+ | 1 | 0 | 0 | 0 | 0.19 | 0001 |
| O/O2− | 1 | 0.25 | 0.25 | 0.25 | 0.66 | 0001 |

Figure 2:
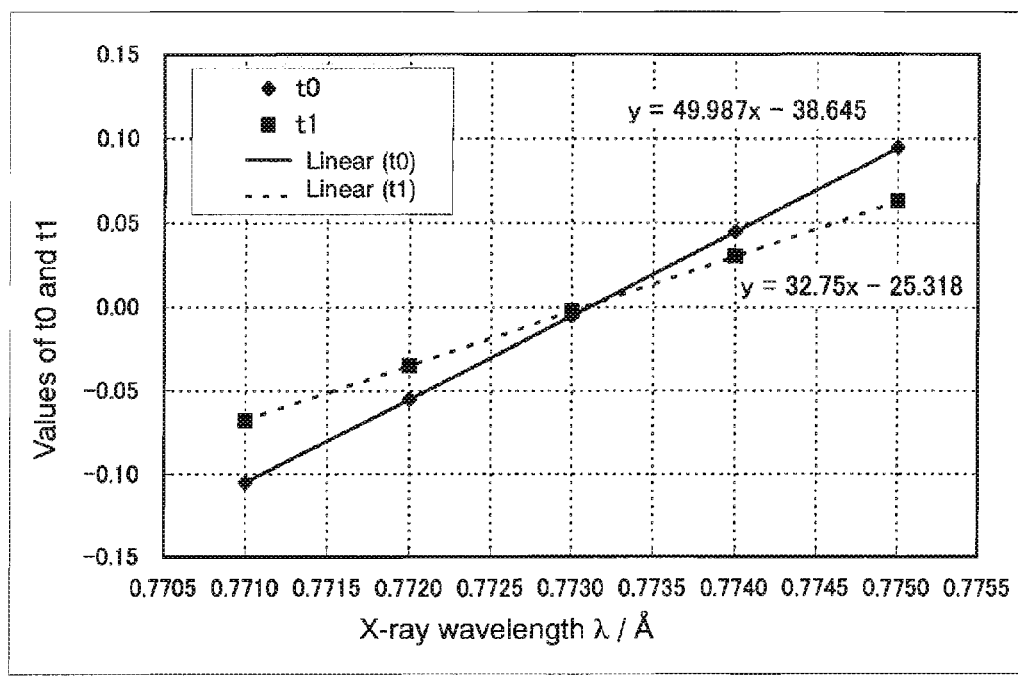
FIG. 2 is a graph showing a relationship between a wavelength λ of an X-ray and peak position shift parameters $t_0$ and $t_1$ used for Rietveld analysis of $CeO_2$.

An example of a relationship between shiftn parameters $t_0$, $t_1$ and $\lambda$ is shown in FIG. 2. The parameters $t_0$ and $t_1$ have an almost linear relationship with $\lambda$. Here, a linear approximation formula $t_n = m_n \lambda - C_n$ (n=0, 1, $m_n$ is a slope, and $C_n$ is a constant), which relates to $\lambda$ and $t_0$, $t_1$, is calculated. Based on the calculation results, a refined incident X-ray wavelength $\lambda_r$ is calculated from the following formula:

$$\lambda_r = (C_0/m_0 + 0.5 C_1/m_1)/1.5.$$

Next, the X-ray diffraction measurement and the Rietveld analysis of a sample of the phosphor are carried out.

The X-ray diffraction measurement is carried out as in the case of $CeO_2$. In this regard, the measuring time is to be determined, paying attention to keep the imaging plate unsaturated, and, for example, it is 5 minutes. Then, the Rietveld analysis is carried out under the conditions shown in Table 2. The analysis is carried out by assuming a mixed phase of two phases: a merwinite structure (ICSD #026002); and an akermanite structure (ICSD #026683). In Table 2 (2), the displacement parameter B of cation is fixed (ID=0), but in the middle of the analysis, the displacement parameter B of cation is refined (ID=1) beforehand while the displacement parameter B of oxygen is fixed, and eventually the displacement parameter B is fixed for the analysis. Further, in the initial stage of the analysis, to is fixed. Furthermore, when attenuation parameters eta_$L_0$, eta_$L_1$, eta_$H_0$ and eta_$H_1$ are fitted simultaneously, there may be a case where they are divergent. In this case, eta_$L_1$ and eta_$H_1$ are fixed. With respect to a background, a refinement is not carried out (i.e., NRANGE=1), and a background file (extension bkg) is prepared. The background file is a file in which the intensities at the angles shown in Table 2 (4) are read from each spectrum.

TABLE 2

(1) Parameter

| NBEAM | 2 |
|---|---|
| NMODE | 0 |
| XLMDX | $\lambda_r$ |
| NSURFR | 2 |
| PCOR2 | 0.05 |
| CTHM2 | 1 |
| XMUR2 | 0 |
| Phase1 | Sr3MgSi2O8 (Merwinite) |
| VNS1 | A-14-3 |
| LSPSYM1 | 0 |
| LPAIR1 | 0 |
| INDIV1 | 1 |
| NPROR1 | 3 |
| IHP1 | 1 |
| IKP1 | 0 |
| ILP1 | 0 |
| LSUM1 | 0 |
| IHA1 | 0 |
| IKA1 | 1 |
| ILA1 | 3 |
| Phase2 | Sr2MgSi2O7 (Akermanite) |
| VNS1 | A-113 |
| LSPSYM2 | 0 |
| LPAIR2 | 0 |
| INDIV2 | 1 |
| NPROR2 | 3 |
| IHP2 | 0 |
| IKP2 | 0 |
| ILP2 | 1 |
| LSUM2 | 1 |
| IHA2 | 0 |
| IKA2 | 0 |
| ILA2 | 1 |
| NPRFN | 2 |
| NSHIFT | 4 |
| NEXC | 1 |
| NRANGE | 1 |
| PC | 7 |
| NLESQ | 0 |
| STEP | 0.02 |
| NC | 0 |
| TK | 650 |
| FINC | 2 |

(2) Initial value and setting of refinement (ID)

| | t0 | t1 | t2 | t3 | ID |
|---|---|---|---|---|---|
| shiftn | The initial value is determined from the result on $CeO_2$. | | | | 1000 |

Phase1 Sr3MgSi2O8 (Merwinite)

| | a | b | c | β | ID |
|---|---|---|---|---|---|
| Lattice constant | 13.8650 | 5.4526 | 9.4434 | 90.1232 | 1110100 |

| atom | Occu-pancy | Fractional coordinate | | | Displacement parameter | Refine-ment |
|---|---|---|---|---|---|---|
| | g | x | y | z | B | ID |
| Sr1/Sr2+ | 1 | 0.2506 | 0.2149 | 0.2472 | 2.6655 | 01110 |
| Sr2/Sr2+ | 1 | 0.0885 | 0.2419 | 0.9209 | 0.9756 | 01110 |
| Sr3/Sr2+ | 1 | 0.0875 | 0.7377 | 0.4179 | 0.7509 | 01110 |
| Mg2/Mg2+ | 1 | −0.0019 | 0.2823 | 0.2487 | 0.4067 | 01110 |
| Si1/Si4+ | 1 | 0.1355 | 0.2551 | 0.5818 | 1.2919 | 01110 |
| Si2/Si4+ | 1 | 0.1345 | 0.7487 | 0.0849 | 0.1688 | 01110 |
| O1/O2− | 1 | 0.1143 | 0.2507 | 0.4090 | 1.8400 | 11111 |
| O2/O2− | 1 | 0.0823 | 0.4469 | 0.6737 | 1.8400 | 11112 |
| O3/O2− | 1 | 0.1012 | 1.0021 | 0.6584 | 1.8400 | 11112 |
| O4/O2− | 1 | 0.2534 | 0.2576 | 0.6313 | 1.8400 | 11112 |
| O5/O2− | 1 | 0.0876 | 0.7520 | 0.9271 | 1.8400 | 11112 |
| O6/O2− | 1 | 0.2403 | 0.7892 | 0.0841 | 1.8400 | 11112 |
| O7/O2− | 1 | 0.0961 | 0.4754 | 0.1647 | 1.8400 | 11112 |
| O8/O2− | 1 | 0.0609 | 0.9865 | 0.2015 | 1.8400 | 11112 |

Phase2 SR2MgSiO7 (Akermanite)

| | a | c | ID |
|---|---|---|---|
| Lattice constant | 8.0042 | 5.1642 | 1010000 |

| atom | Occu-pancy | Fractional coordinate | | | Displacement parameter | Refine-ment |
|---|---|---|---|---|---|---|
| | g | x | y | z | B | ID |
| Sr21/Sr2+ | 1 | 0.3155 | 0.1845 | 0.5616 | 2 | 01210 |
| Mg21/Mg2+ | 1 | 0.0000 | 0.0000 | 0.0000 | 0.5 | 00000 |
| Si21/Si4+ | 1 | 0.0965 | 0.4035 | 0.7431 | 0.5 | 01210 |
| O21/O2− | 1 | 0.5000 | 0.0000 | 0.6286 | 1.2 | 00010 |
| O22/O2− | 1 | 0.5212 | −0.0212 | 0.1985 | 1.2 | 01210 |
| O23/O2− | 1 | 0.0952 | 0.1970 | 1.1030 | 1.2 | 01110 |

TABLE 2-continued (3)Binding condition

A(O2,B) = A(O1,B)
A(O3,B) = A(O1,B)
A(O4,B) = A(O1,B)
A(O5,B) = A(O1,B)
A(O6,B) = A(O1,B)
A(O7,B) = A(O1,B)
A(O8,B) = A(O1,B)
A(Sr21,y) = 0.5-A(Sr21,x)
A(Si21,y) = 0.5-A(Si21,x)
A(O22,y) = 0.5-A(O22,x)
A(FWHM122,1) = A(FWHM12,1)
A(FWHM122,2) = A(FWHM12,2)
A(FWHM122,3) = A(FWHM12,3)
A(ASYM122,1) = A(ASYM12,1)
A(ASYM122,2) = A(ASYM12,2)
A(ASYM122,3) = A(ASYM12,3)
A(ETA122,1) = A(ETA12,1)
A(ETA122,2) = A(ETA12,2)
A(ETA122,3) = A(ETA12,3)
A(ETA122,4) = A(ETA12,4)

(4)Angle setting of background 5.00
6.19
7.70
9.19
10.70
11.88
13.31
13.78
14.47
14.93
15.30
17.40
18.46
19.54
20.28
22.40
23.85
25.64
26.11
27.73
29.09
30.19
31.12
32.58
34.23
35.16
37.38
39.96
40.90
42.07
44.81
45.93
47.48
51.23
54.61
56.44
57.86

<Method of Producing Phosphor>

Hereinafter, the method of producing the phosphor of the present invention will be described. The method of producing the phosphor of the present invention is not limited thereto. Even if the phosphor is obtained by a method different from the following producing method, the phosphor is included within the scope of the present invention as long as it has the above-mentioned composition and the properties identified by the X-ray diffraction measurement.

As a strontium source material, a strontium compound that can be converted into strontium oxide by firing, such as strontium hydroxide, strontium carbonate, strontium nitrate, strontium halide, or strontium oxalate having a high purity (purity of 99% or more) may be used. Strontium oxide having a high purity (purity of 99% or more) also may be used.

As a magnesium source material, a magnesium compound that can be converted into magnesium oxide by firing, such as magnesium hydroxide, magnesium carbonate, magnesium nitrate, magnesium halide, magnesium oxalate, or basic magnesium carbonate having a high purity (purity of 99% or more) may be used. Magnesium oxide having a high purity (purity of 99% or more) also may be used.

As a europium source material, a europium compound that can be converted into europium oxide by firing, such as europium hydroxide, europium carbonate, europium nitrate, europium halide, or europium oxalate having a high purity (purity of 99% or more) may be used. Europium oxide having a high purity (purity of 99% or more) also may be used.

As a silicon source material, various source materials that can be converted into oxides may be used in the same way.

The method for mixing source materials may be wet mixing in a solution or dry mixing of dry powders. A ball mill, a stirred media mill, a planetary mill, a vibration mill, a jet mill, a V-type mixer, an agitator and the like, which are in general industrial use, may be used. Since coarse particles in the source materials adversely affect the light-emitting property, it is preferable that the particles are classified to improve particle size uniformity.

Next, the mixed powders are fired to obtain a phosphor. The properties of a phosphor depend on the starting composition, firing conditions and classification conditions. In producing a conventional silicate phosphor, firing is carried out under a reducing atmosphere such as a nitrogen gas that contains hydrogen. In the present invention, however, firing is carried out under a weakly reducing atmosphere in which a partial pressure of oxygen is adjusted. Firing under a weakly reducing atmosphere in which oxygen is introduced allows the obtained phosphor to have the above-described properties identified by the X-ray diffraction measurement (crystal structure (unit cell volume, axis lengths a, b and c, and angle $\beta$), akermanite ratio, and one-fifth value width of a peak around $2\theta=22.86$ degrees). The firing temperature may be 1200 to 1400° C., and preferably is 1250 to 1300° C. The firing time may be 0.5 to 10 hours, and more preferably is 1 to 6 hours. The firing temperature may be adjusted as appropriate within this range depending on the classification conditions. The partial pressure of oxygen preferably is $1\times10^{-9}$ to $1\times10^{-5}$ Pa.

As a furnace used for the firing, furnaces that are in general industrial use may be used. A gas furnace or an electric furnace of batch type or continuous type such as a pusher furnace may be used.

When a hydroxide, a carbonate, a nitrate, a halide, an oxalate or the like that can be converted into oxide by firing is used as a source material, it is preferable that pre-firing is carried out before main firing. The pre-firing may be carried out in an air atmosphere, but should be carried out at a temperature lower than that of the main firing by about 150° C.

The particle size distribution and flowability of the phosphor powder can be adjusted by crushing the obtained phosphor powder again using a ball mill, jet mill, or the like, and further by washing or classification, if necessary.

<Uses of Phosphor>

A light-emitting device having good luminance, chromaticity and luminance retaining rate can be constructed by applying the phosphor of the present invention to a light-emitting device having a phosphor layer. Specifically, in a light-emitting device having a phosphor layer that includes BAM:Eu, all or part of BAM:Eu is replaced with the phosphor of the present invention, and a light-emitting device may be constructed according to a known method. Examples of the light-emitting device include a PDP, a fluorescent panel, and a fluorescent lamp, and among them, a PDP is suitable.

Hereinafter, an embodiment wherein the phosphor of the present invention is applied to a PDP (which is also an embodiment of the PDP of the present invention) will be described with an example of an AC surface-discharge type PDP. FIG. 1 is a cross-sectional perspective view showing a principal configuration of an AC surface-discharge type PDP 10. It should be noted that the PDP shown here is illustrated for convenience' sake with a size that is appropriate for a specification of 1024×768 pixels, which is 42-inch class, and the present invention may be applied to other sizes and specifications as well.

As illustrated in FIG. 1, this PDP 10 includes a front panel 20 and a back panel 26, and these panels are arranged with their main surfaces facing each other.

The front panel 20 includes a front panel glass 21 as a front substrate, strip-shaped display electrodes (X-electrode 23, Y-electrode 22) provided on one main surface of the front panel glass 21, a front-side dielectric layer 24 having a thickness of about 30 µm covering the display electrodes, and a protective layer 25 having a thickness of about 1.0 µm provided on the front-side dielectric layer 24.

The above display electrode includes a strip-shaped transparent electrode 220 (230) with a thickness of 0.1 µm and a width of 150 µm, and a bus line 221 (231) having a thickness of 7 µm and a width of 95 µm and laid on the transparent electrode. A plurality of pairs of the display electrodes are disposed in the y-axis direction, where the x-axis direction is a longitudinal direction.

Each pair of display electrodes (X-electrode 23, Y-electrode 22) is connected electrically to a panel drive circuit (not shown) in the vicinity of the ends of the width direction (y-axis direction) of the front panel glass 21. It should be noted that the Y-electrodes 22 are connected collectively to the panel drive circuit and the X-electrodes 23 are each independently connected to the panel drive circuit. When the Y-electrodes 22 and the certain X-electrodes 23 are fed using the panel drive circuit, a surface discharge (sustained discharge) is generated in the gap (approximately 80 µm) between the X-electrode 23 and the Y-electrode 22. The X-electrode 23 can operate as a scan electrode, and in this case, a write discharge (address discharge) can be generated between the X-electrode 23 and an address electrode 28 to be described later.

The above-mentioned back panel 26 includes a back panel glass 27 as a back substrate, a plurality of address electrodes 28, a back-side dielectric layer 29, barrier ribs 30, and phosphor layers 31 to 33, each of which corresponds to one color of red (R), green (G), and blue (B). The phosphor layers 31 to 33 are provided so that they contact with side walls of two adjacent barrier ribs 30 and with the back-side dielectric layer 29 between the adjacent barrier ribs 30, and repeatedly disposed in sequence in the x-axis direction.

The blue phosphor layer (B) contains the above-mentioned phosphor of the present invention. It should be noted that the phosphor of the present invention may be used alone, used as a mixture of these phosphors, or used as a mixture with a known phosphor such as BAM:Eu. On the other hand, the red phosphor layer and the green phosphor layer contain commonly-used phosphors. Examples of a red phosphor include $(Y,Gd)BO_3:Eu$ and $Y_2O_3:Eu$, and examples of a green phosphor include $Zn_2SiO_4:Mn$, $YBO_3:Tb$, and $(Y,Gd)BO_3:Tb$.

Each phosphor layer can be formed by applying a phosphor ink in which phosphor particles are dissolved to the barrier ribs 30 and the back-side dielectric layer 29 by a known applying method such as a meniscus method and a line jet method, and drying and firing (e.g., at 500° C., for 10 minutes) them. The above-mentioned phosphor ink can be prepared, for example, by mixing 30% by mass of the blue phosphor with a volume average particle diameter of 2 µm, 4.5% by mass of ethyl cellulose with a mass average molecular weight of about 200,000, and 65.5% by mass of butyl carbitol acetate. In this regard, it is preferable that a viscosity thereof is adjusted eventually to 2000 to 6000 cP (2 to 6 Pas), since the adherence of the ink to the barrier ribs 30 can be enhanced.

The address electrodes 28 are provided on the one main surface of the back panel glass 27. The back-side dielectric layer 29 is provided so as to cover the address electrodes 28. The barrier ribs 30 have a height of about 150 µm and a width of about 40 µm, and the longitudinal direction is the y-axis direction. The barrier ribs 30 are provided on the back-side dielectric layer 29 so as to correspond to the pitch of the adjacent address electrodes 28.

Each of the address electrodes 28 has a thickness of 5 µm and a width of 60 µm. A plurality of address electrodes 28 are disposed in the x-axis direction, where the y-axis direction is a longitudinal direction. The address electrodes 28 are disposed at a certain pitch (about 150 µm). A plurality of address electrodes 28 are each independently connected to the above-mentioned panel drive circuit. Address discharge can be generated between a certain address electrode 28 and a certain X-electrode 23 by feeding each address electrode individually.

The front panel 20 and the back panel 26 are disposed so that the address electrode 28 and the display electrode are orthogonal to each other. The peripheral portions of both the panels 20 and 26 are bonded and sealed with a frit glass sealing portion (not shown) that serves as a sealing member.

An enclosed space between the front panel 20 and the back panel 26, which has been bonded and sealed with the frit glass sealing portion, is filled with a discharge gas composed of a rare gas such as He, Xe and Ne at a predetermined pressure (ordinarily about $6.7 \times 10^4$ to $1.0 \times 10^5$ Pa).

It should be noted that a space corresponding to a space between two adjacent barrier ribs 30 is a discharge space 34. A region where a pair of display electrodes and one address electrode 28 intersect with a discharge space 34 in between corresponds to a cell used for displaying images. It should be noted that in this embodiment, the cell pitch in the x-axis direction is set to approximately 300 µm and the cell pitch in the y-axis direction is set to approximately 675 µm.

When the PDP 10 is driven, a sustained discharge is generated by applying a pulse to between a pair of the display electrodes (X-electrode 23, Y-electrode 22) after an address discharge is generated by applying a pulse voltage to the certain address electrode 28 and the certain X-electrode 23 by the panel drive circuit. The phosphors contained in the phosphor layers 31 to 33 are allowed to emit visible light using the ultraviolet ray with a short wavelength (a resonance line with a central wavelength of about 147 nm and a molecular beam with a central wavelength of 172 nm) thus generated. Thereby, a prescribed image can be displayed on the front panel side.

This PDP has the blue luminance and chromaticity comparable to those of a PDP using BAM:Eu that is used conventionally. In addition, the PDP has the excellent resistance to luminance degradation along with the image display.

The phosphor of the present invention can be applied to a fluorescent panel including a fluorescent layer that is excited by an ultraviolet ray and then emits light according to a known manner. This fluorescent panel has a good luminance as well as an excellent resistance to luminance degradation compared to the conventional fluorescent panels. This fluorescent panel can be used, for example, as a backlight of a liquid crystal display device.

The phosphor of the present invention can be applied also to a fluorescent lamp (e.g., electrodeless fluorescent lamp etc.) according to a known manner. This fluorescent lamp has a good luminance as well as an excellent resistance to luminance degradation compared to the conventional fluorescent lamps.

Hereinafter, the present invention will be described in detail giving Examples.

(Examples of Production of Phosphors)

As starting materials, $SrCO_3$, $Eu_2O_3$, MgO, and $SiO_2$ were used. These were weighed according to the compositions shown in Table 3, and wet-mixed in pure water using a ball mill. Since coarse particles in the source materials adversely affect the light-emitting property, the particles were classified to improve particle size uniformity in some of the Examples.

After these mixtures were dried and pre-fired, they were fired for 4 hours at temperatures shown in Table 3 under a weakly reducing atmosphere in which a partial pressure of oxygen is adjusted. Phosphors of Examples and Comparative Examples thus were obtained. In Table 3, "excessively high", "high", "medium", and "low" indicate partial pressures of oxygen of higher than $1 \times 10^{-5}$ Pa, around $1 \times 10^{-5}$ Pa, around $1 \times 10^{-7}$ Pa, and lower than $1 \times 10^{-9}$ Pa, respectively.

(Powder X-Ray Diffraction Measurement)

The X-ray diffraction patterns of the phosphors of Examples and Comparative Examples were measured and analyzed by the above-mentioned method, using BL19 diffraction equipment in the large-scale synchrotron radiation facility, SPring 8.

<Panel Luminance and Luminance Retaining Rate>

PDPs having the configuration of FIG. 1 were manufactured according to the configuration of the above-described example of an AC surface-discharge type PDP, using the blue phosphors of Examples and Comparative Examples. Accelerated aging test was carried out for the panels thus produced. How much the luminance values were lowered from the initial luminance value after aging equivalent to 3000 hours was measured to calculate the luminance retaining rates. In this regard, the luminance is a luminance Y in the XYZ color coordinate system of International Commission on Illumination, and the relative luminance is a value relative to the initial luminance of the standard sample BAM:Eu ($Ba_{0.9}MgAl_{10}O_{17}$:$Eu_{0.1}$).

<Relationship Among Composition, Crystal Structure, and Luminance and Others>

Figure 3:
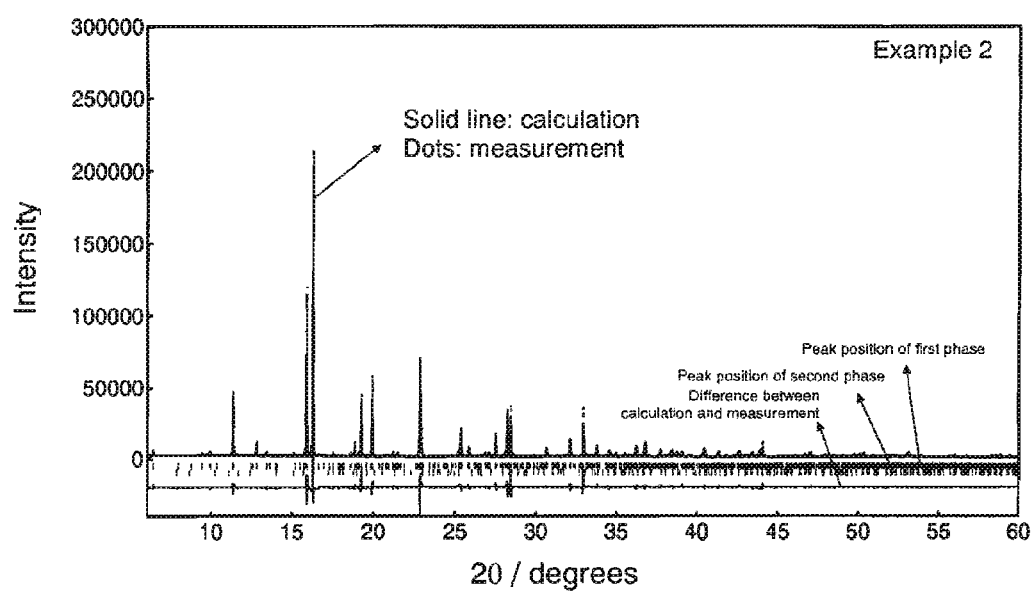
FIG. 3 is a graph showing one example of a Rietveld analysis result of a phosphor of Example 2.
Figure 4:
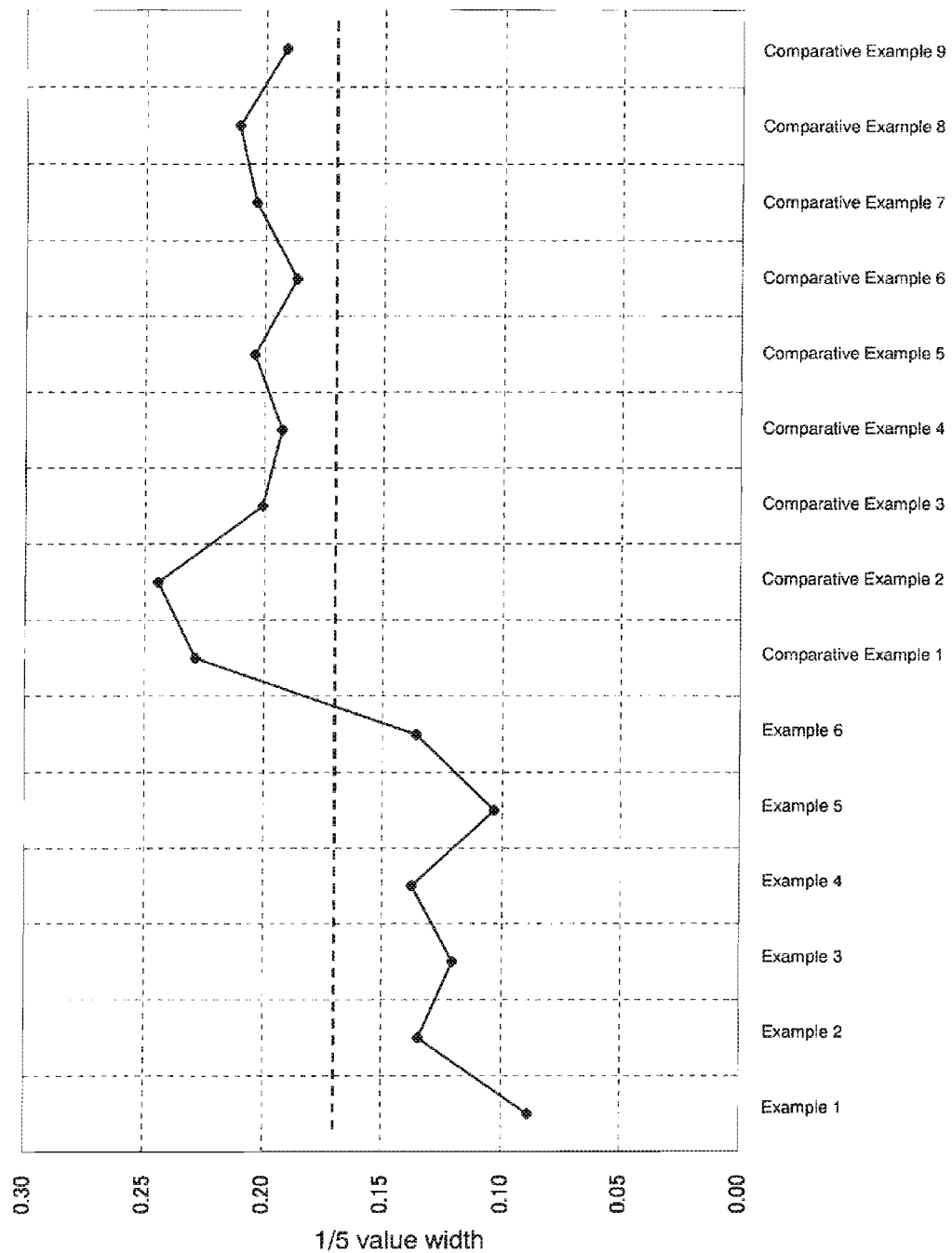
FIG. 4 is a graph showing one-fifth value widths of peaks around $2\theta = 22.86$ degrees of Examples 1 to 6 and Comparative Examples 1 to 9.
Figure 5:
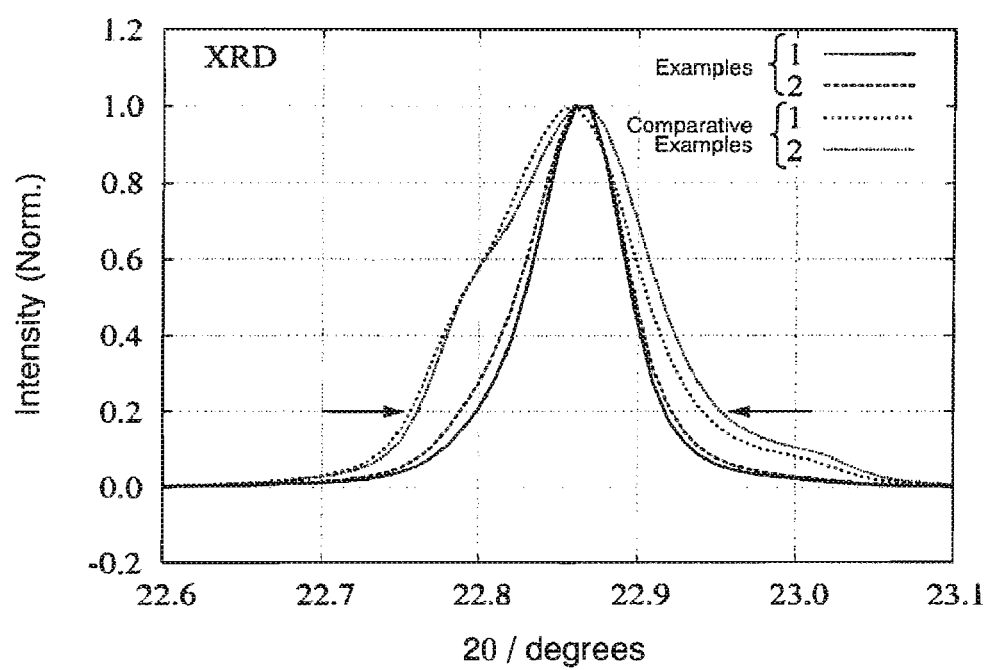
FIG. 5 is an enlarged view of X-ray diffraction peaks around $2\theta = 22.86$ degrees of Examples 1 and 2 and Comparative Examples 1 and 2.

Table 3 shows the compositions (x, y, and z values of the general formula $xSrO \cdot yEuO \cdot MgO \cdot zSiO_2$) of the samples prepared, whether the materials thereof were classified or not, partial pressures of oxygen, and firing temperatures. Table 3 also shows the relationship among the crystal structures (unit cell volumes V, axis lengths a, b and c, and angles β), arkemanite ratios, and one-fifth value widths of peaks around 2θ=22.86 degrees, which were obtained by the X-ray diffraction measurement, and the relative luminances and luminance retaining rates. FIG. 3 shows the Rietveld analysis result of a phosphor of Example 2 as an example. FIG. 4 shows the one-fifth value widths of respective samples. FIG. 5 shows an enlarged view of the X-ray diffraction peaks around 2θ=22.86 degrees of Examples 1 and 2 as well as Comparative Examples 1 and 2.

TABLE 3

| Sample No. | x | y | z | Classification of materials | Partial pressure of oxygen | Firing temperature/°C. | Volume/Å3 | a/Å |
|---|---|---|---|---|---|---|---|---|
| Example 1 | 2.9910 | 0.0090 | 2.0000 | Yes | Medium | 1275 | 713.8 | 13.864 |
| Example 2 | 2.9886 | 0.0114 | 2.0000 | No | Medium | 1250 | 713.9 | 13.864 |
| Example 3 | 2.9880 | 0.0120 | 2.0000 | No | Medium | 1250 | 713.9 | 13.864 |
| Example 4 | 2.9874 | 0.0126 | 2.0000 | No | High | 1250 | 714.0 | 13.864 |
| Example 5 | 2.9895 | 0.0105 | 2.0000 | Yes | Medium | 1275 | 714.0 | 13.864 |
| Example 6 | 2.9940 | 0.0060 | 2.0000 | Yes | Medium | 1275 | 714.5 | 13.869 |
| Comparative Example 1 | 2.9940 | 0.0060 | 2.0000 | No | Low | 1300 | 715.2 | 13.874 |
| Comparative Example 2 | 2.9880 | 0.0120 | 2.0000 | No | Low | 1300 | 715.2 | 13.875 |
| Comparative Example 3 | 2.9910 | 0.0090 | 2.0000 | No | Low | 1300 | 715.3 | 13.875 |
| Comparative Example 4 | 2.9850 | 0.0150 | 2.0000 | No | Excessively high | 1250 | 714.4 | 13.868 |
| Comparative Example 5 | 2.9910 | 0.0090 | 2.0000 | No | Low | 1300 | 715.3 | 13.873 |
| Comparative Example 6 | 2.9910 | 0.0090 | 2.0000 | No | Low | 1300 | 715.3 | 13.875 |
| Comparative Example 7 | 2.9910 | 0.0090 | 2.0000 | No | High | 1100 | 715.5 | 13.876 |
| Comparative Example 8 | 2.9910 | 0.0090 | 2.0000 | No | High | 1150 | 715.5 | 13.874 |
| Comparative Example 9 | 2.9910 | 0.0090 | 2.0000 | No | High | 1150 | 715.7 | 13.877 |

| Sample No. | b/Å | c/Å | β/degrees | Akermanite ratio/% | 1/5 value width/degrees | Relative luminance/% | Luminance retaining rate/% |
|---|---|---|---|---|---|---|---|
| Example 1 | 5.453 | 9.443 | 90.124 | 0.92 | 0.089 | 109 | 95 |
| Example 2 | 5.453 | 9.443 | 90.142 | 0.88 | 0.135 | 105 | 95 |
| Example 3 | 5.453 | 9.444 | 90.146 | 1.05 | 0.121 | 100 | 100 |
| Example 4 | 5.453 | 9.444 | 90.162 | 0.89 | 0.138 | 99 | 100 |
| Example 5 | 5.453 | 9.444 | 90.136 | 0.85 | 0.103 | 109 | 95 |
| Example 6 | 5.454 | 9.446 | 90.156 | 1.96 | 0.136 | 95 | 95 |

TABLE 3-continued

|  | | | | | | | |
|---|---|---|---|---|---|---|---|
| Comparative Example 1 | 5.456 | 9.448 | 90.214 | 2.46 | 0.229 | 89 | 80 |
| Comparative Example 2 | 5.456 | 9.449 | 90.223 | 3.51 | 0.244 | 85 | 90 |
| Comparative Example 3 | 5.456 | 9.449 | 90.189 | 1.96 | 0.201 | 100 | 80 |
| Comparative Example 4 | 5.454 | 9.445 | 90.184 | 1.34 | 0.193 | 94 | 100 |
| Comparative Example 5 | 5.457 | 9.450 | 90.201 | 2.05 | 0.204 | 102 | 85 |
| Comparative Example 6 | 5.456 | 9.449 | 90.192 | 2.63 | 0.186 | 98 | 75 |
| Comparative Example 7 | 5.457 | 9.450 | 90.217 | 2.10 | 0.204 | 99 | 75 |
| Comparative Example 8 | 5.457 | 9.451 | 90.209 | 2.28 | 0.211 | 95 | 76 |
| Comparative Example 9 | 5.457 | 9.451 | 90.206 | 2.27 | 0.191 | 95 | 77 |

Assuming that it is preferable that both the relative luminance and the luminance retaining rate are at least 95%, Table 3 shows that the unit cell volume should be 714.8 Å$^3$ or less. In addition, it is preferable that the a-axis length is 13.87 Å or less, the b-axis length is 5.455 Å or less, the c-axis length is 9.447 Å or less, and the angle β between the a-axis and the b-axis is 90.180 degrees or less. In addition, it is preferable that the arkemanite ratio as an impurity phase is 1.96% or less. On the other hand, the one-fifth value width of the peak around 22.86 degrees should be 0.17 degrees or less.

As for the composition, substantially, $2.982 \leq x \leq 2.994$, $0.006 \leq y \leq 0.018$, and $1.995 \leq z \leq 2.005$ are preferable, and $2.985 \leq x \leq 2.994$, $0.006 \leq y \leq 0.018$, and $z=2.000$ are most preferable, judging from Table 3. However, it is actually conceivable that the cases may occur in which some atoms are not incorporated in the crystal, or coexisting atoms which have been mixed with the phosphor after the completion of the phosphor has no adverse effects. Taking these cases into consideration, the composition should satisfy $2.970 \leq x \leq 3.500$, $0.006 \leq y \leq 0.030$, and $1.900 \leq z \leq 2.100$.

Figure 6:
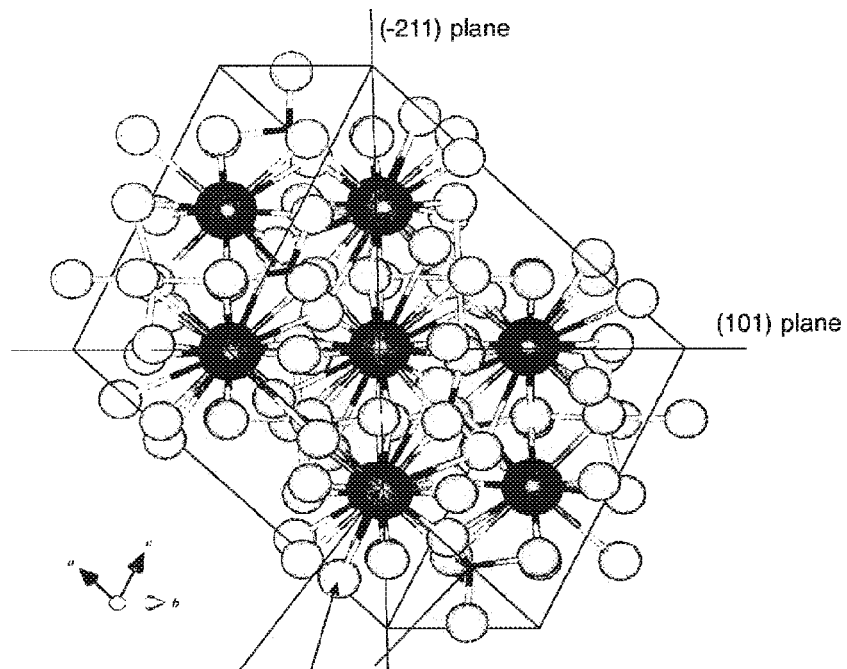
FIG. 6 is a schematic perspective view of crystal structures of silicate phosphors of Example 1 and Comparative Example 2 as seen from the direction parallel to both a −211 plane and a 101 plane.
Figure 6:
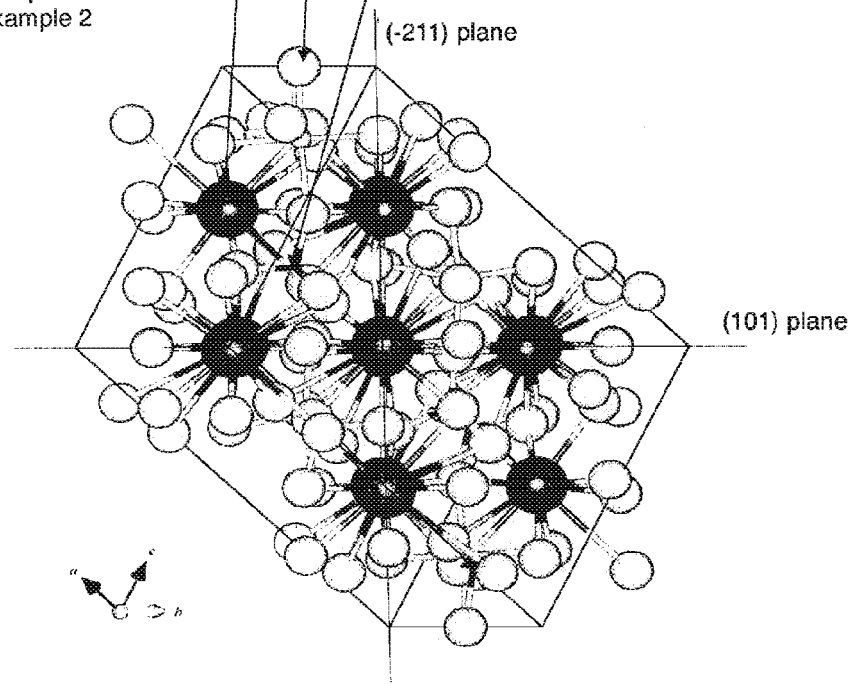

The present inventors carried out the refinement by the Rietveld analysis, assuming that all the silicate blue phosphors of Examples of the present invention and Comparative Examples have the merwinite structure. As a result, it was found that the peak around 22.86 degrees corresponds to an interplanar spacing d=1.95 Å and is an overlap mainly of the peak of plane indices (h, k, l)=(−4, 2, 2) and the peak of plane indices (h, k, l)=(4, 0, 4). FIG. 6 is a perspective view of crystal structures of phosphors of Example 1 and Comparative Example 2 as seen from the direction parallel to both the −211 plane and the 101 plane. This diagram shows that in the phosphor of Example 1 having excellent properties, how properly Sr atoms are placed on both the −211 plane and the 101 plane, compared to that of Comparative Example 2. Therefore, it is presumed that the deviation of a Sr atom from the normal position defines the one-fifth value width of the peak around 2θ=22.86 degrees.

INDUSTRIAL APPLICABILITY

The use of the phosphor of the present invention provides a long-life plasma display panel that has a high luminance and high color purity and shows less luminance degradation during driving. The phosphor of the present invention also can be applied to applications such as a fluorescent lamp like an electrodeless fluorescent lamp, and a fluorescent panel to be used for a backlight of a liquid crystal display device, and the like.

The invention claimed is:

1. A blue phosphor that is represented by a general formula $xSrO \cdot yEuO \cdot MgO \cdot zSiO_2$, where $2.970 \leq x \leq 3.500$, $0.006 \leq y \leq 0.030$, and $1.900 \leq z \leq 2.100$,
    wherein the blue phosphor has a crystal structure that is essentially a merwinite structure, and
    the crystal structure has a unit cell volume of 714.8 Å$^3$ or less.
2. The blue phosphor according to claim 1,
    wherein an a-axis length is 13.871 Å or less.
3. The blue phosphor according to claim 1,
    wherein a b-axis length is 5.455 Å or less.
4. The blue phosphor according to claim 1,
    wherein a c-axis length is 9.447 Å or less.
5. The blue phosphor according to claim 1,
    wherein an angle β between the a-axis and the c-axis is 90.180 degrees or less.
6. The blue phosphor according to claim 1,
    wherein the blue phosphor has an impurity crystalline phase at least partially, and
    the impurity crystalline phase has an akermanite structure.
7. The blue phosphor according to claim 6,
    wherein the abundance ratio of the impurity crystalline phase having the akermanite structure is 1.96% or less.
8. A blue phosphor that is represented by a general formula $xSrO \cdot yEuO \cdot MgO \cdot zSiO_2$, where $2.97 \leq x \leq 3.500$, $0.006 \leq y \leq 0.030$, and $1.900 \leq z \leq 2.100$,
    wherein a peak has a one-fifth value width of 0.17 degrees or less, the peak appearing around 2θ=22.86 degrees in an X-ray diffraction pattern obtained by measurement of the blue phosphor using an X-ray with a wavelength of 0.773 Å.
9. The blue phosphor according to claim 1,
    wherein in the general formula, $2.982 \leq x \leq 2.994$, $0.006 \leq y \leq 0.018$, and $1.995 \leq z \leq 2.005$ are satisfied.
10. A light-emitting device, comprising a phosphor layer including the phosphor according to claim 1.
11. The light-emitting device according to claim 10,
    wherein the light-emitting device is a plasma display panel.
12. The light-emitting device according to claim 11,
    wherein the plasma display panel comprises:
    a front panel;
    a back panel that is arranged to face the front panel;
    barrier ribs that define the clearance between the front panel and the back panel;
    a pair of electrodes that are disposed on the back panel or the front panel;
    an external circuit that is connected to the electrodes;

a discharge gas that is present at least between the electrodes and contains xenon that generates a vacuum ultraviolet ray by applying a voltage between the electrodes through the external circuit; and phosphor layers that emit visible light induced by the vacuum ultraviolet ray, the phosphor layers include a blue phosphor layer, and the blue phosphor layer contains the phosphor.

13. The blue phosphor according to claim 1, wherein the blue phosphor is obtained by firing a mixed powder of source materials at 1200 to 1400° C. under a partial pressure of oxygen of $1\times10^{-9}$ to $1\times10^{-5}$ Pa.

14. The blue phosphor according to claim 8, wherein the blue phosphor is obtained by firing a mixed powder of source materials at 1200 to 1400° C. under a partial pressure of oxygen of $1\times10^{-9}$ to $1\times10^{-5}$ Pa.

15. The blue phosphor according to claim 8, wherein in the general formula, $2.982 \leqq x \leqq 2.994$, $0.006 \leqq y \leqq 0.018$, and $1.995 \leqq z \leqq 2.005$ are satisfied.

16. A light-emitting device, comprising a phosphor layer including the phosphor according to claim 8.

17. The light-emitting device according to claim 16, wherein the light-emitting device is a plasma display panel.

18. The light-emitting device according to claim 17, wherein the plasma display panel comprises:

a front panel;

a back panel that is arranged to face the front panel;

barrier ribs that define the clearance between the front panel and the back panel;

a pair of electrodes that are disposed on the back panel or the front panel;

an external circuit that is connected to the electrodes;

a discharge gas that is present at least between the electrodes and contains xenon that generates a vacuum ultraviolet ray by applying a voltage between the electrodes through the external circuit; and phosphor layers that emit visible light induced by the vacuum ultraviolet ray, the phosphor layers include a blue phosphor layer, and the blue phosphor layer contains the phosphor.

\* \* \* \* \*

UNITED STATES PATENT AND TRADEMARK OFFICE
CERTIFICATE OF CORRECTION

PATENT NO.         : 7,902,756 B2                             Page 1 of 1
APPLICATION NO.    : 12/278345
DATED              : March 8, 2011
INVENTOR(S)        : Sakai et al.

It is certified that error appears in the above-identified patent and that said Letters Patent is hereby corrected as shown below:

Title page, Item (57)
Line 2: "$xSrO.yEuO.MgO.zSiO_2$" should read --$xSrO\cdot yEuO\cdot MgO\cdot zSiO_2$--.

Column 1, line 58: "$xSrO.yEuO.MgO.zSiO_2$" should read --$xSrO\cdot yEuO\cdot MgO\cdot zSiO_2$--.
Column 2, line 5: "$xSrO.yEuO.MgO.zSiO_2$" should read --$xSrO\cdot yEuO\cdot MgO\cdot zSiO_2$--.
Column 2, line 12: "$xSrO.yEuO.MgO.zSiO_2$" should read --$xSrO\cdot yEuO\cdot MgO\cdot zSiO_2$--.
Column 2, line 64: "$xSrO.yEuO.MgO.zSiO_2$" should read --$xSrO\cdot yEuO\cdot MgO\cdot zSiO_2$--.

Column 14, line 22 (Claim 1): "$xSrO.yEuO.MgO.zSiO_2$" should read --$xSrO\cdot yEuO\cdot MgO\cdot zSiO_2$--.
Column 14, line 45 (Claim 8): "$xSrO.yEuO,MgO.zSiO_2$" should read --$xSrO\cdot yEuO\cdot MgO\cdot zSiO_2$--.
Column 14, line 45 (Claim 8): "2.97" should read --2.970--.

Signed and Sealed this
Twenty-seventh Day of September, 2011

David J. Kappos
*Director of the United States Patent and Trademark Office*

UNITED STATES PATENT AND TRADEMARK OFFICE
CERTIFICATE OF CORRECTION

PATENT NO.         : 7,902,756 B2
APPLICATION NO.    : 12/278345
DATED              : March 8, 2011
INVENTOR(S)        : Sakai et al.

Page 1 of 1

It is certified that error appears in the above-identified patent and that said Letters Patent is hereby corrected as shown below:

Column 12, line 19: "xSrO.yEuO.MgO.zSiO$_2$" should read -- xSrO•yEuO•MgO•zSiO$_2$ --

Signed and Sealed this
Thirty-first Day of January, 2012

David J. Kappos
*Director of the United States Patent and Trademark Office*